US012698968B2

(12) United States Patent
Buffoli et al.

(10) Patent No.: US 12,698,968 B2
(45) Date of Patent: Aug. 4, 2026

(54) INERTIAL SENSOR ARCHITECTURE WITH BALANCED SENSE MODE AND IMPROVED IMMUNITY TO QUADRATURE EFFECTS

(71) Applicants:COMMISSARIAT A L'ENERGIE ATOMIQUE ET AUX ENERGIES ALTERNATIVES, Paris (FR); POLITECNICO DI MILANO, Milan (IT)

(72) Inventors: Andrea Buffoli, Villa Carcina (IT); Giacomo Langfelder, Milan (IT); Valentina Zega, Milan (IT); Thierry Verdot, Grenoble Cedex (FR)

(73) Assignees: COMMISSARIAT A L'ENERGIE ATOMIQUE ET AUX ENERGIES ALTERNATIVES, Paris (FR); POLITECNICO DI MILANO, Milan (IT)

( * ) Notice: Subject to any disclaimer, the term of this patent is extended or adjusted under 35 U.S.C. 154(b) by 315 days.

(21) Appl. No.: 18/530,792

(22) Filed: Dec. 6, 2023

(65) Prior Publication Data

US 2024/0191994 A1     Jun. 13, 2024

(30) Foreign Application Priority Data

Dec. 8, 2022     (EP) ..................................... 22315317

(51) Int. Cl.
*G01C 19/574*          (2012.01)
(52) U.S. Cl.
CPC .................................. *G01C 19/574* (2013.01)

(58) Field of Classification Search
CPC ...................................................... G01C 19/574
See application file for complete search history.

(56) References Cited

U.S. PATENT DOCUMENTS 8,616,057 B1 *  12/2013  Mao ...................... G01C 19/574
                                                        73/504.12
10,520,315 B2 *  12/2019  Tocchio ............... G01C 19/574
                          (Continued)

OTHER PUBLICATIONS

Extended European Search Report issued Jun. 6, 2023 in European Application 22315317.2 filed on Dec. 8, 2022, 11 pages (with Written Opinion).

(Continued)

*Primary Examiner* — Mark A Shabman
(74) *Attorney, Agent, or Firm* — Oblon, McClelland, Maier & Neustadt, L.L.P.

(57)          ABSTRACT

An inertial sensor including a substrate, sense frames, drive frames configured to put into motion the sense frames, and a sense lever pivotably mounted around a rotation axis. The sense frames, drive frames and sense lever are connected to each other in such a way that when the inertial sensor is subjected to a rotational movement around the rotation axis, the first sense frame, the second sense frame and the sense lever respectively feature a first tilt $\theta_1$ a second tilt $\theta_2$ and a lever tilt $\theta_S$ relatively to the device plane, and both $\theta_1/\theta_S$ and $\theta_2/\theta_S$ are lower than 0.1. The inertial sensor features strain gauges that get stressed when the lever rotates due to the motion of the sense frames.

11 Claims, 5 Drawing Sheets

(56)                    References Cited

U.S. PATENT DOCUMENTS

| | | | | |
|---|---|---|---|---|
| 10,823,569 | B1 * | 11/2020 | Shao | G01C 19/5656 |
| 2011/0154898 | A1 * | 6/2011 | Cazzaniga | G01C 19/5747 |
| | | | | 73/504.12 |
| 2013/0176825 | A1 | 7/2013 | Heitz et al. | |
| 2014/0026662 | A1 * | 1/2014 | Anac | G01C 19/56 |
| | | | | 73/504.12 |
| 2014/0366631 | A1 * | 12/2014 | Seeger | G01C 19/5762 |
| | | | | 73/504.12 |
| 2014/0373627 | A1 * | 12/2014 | Pruetz | G01C 19/5712 |
| | | | | 73/504.12 |
| 2015/0268115 | A1 | 9/2015 | Robert et al. | |
| 2015/0377623 | A1 * | 12/2015 | Waters | G01C 19/5705 |
| | | | | 73/504.12 |
| 2016/0231116 | A1 | 8/2016 | Piirainen | |
| 2017/0016726 | A1 * | 1/2017 | Hattass | G01C 19/5733 |
| 2018/0112981 | A1 * | 4/2018 | Tocchio | G01C 19/574 |
| 2018/0135984 | A1 * | 5/2018 | Song | G01C 19/5712 |
| 2018/0238689 | A1 * | 8/2018 | Ruohio | G01P 15/125 |
| 2022/0260372 | A1 * | 8/2022 | Geisberger | G01C 19/574 |

OTHER PUBLICATIONS

Dellea et al., "MEMS Gyroscopes Based on Piezoresistive NEMS Detection of Drive and Sense Motion", Journal of Microelectromechanical Systems, vol. 26, No. 6, Dec. 2017, 11 pages.
Gadola et al., "1.3 mm$^2$ Nav-Grade NEMS-Based Gyroscope", Journal of Microelectromechanical Systems, vol. 30, No. 4, Aug. 2021, 8 pages.
Gadola et al., "600 μdps/√Hz, 1.2 mm$^2$ MEMS Pitch Gyroscope", 2021 IEEE International Symposium on Inertial Sensors and Systems, 2021, 4 pages.

* cited by examiner

Detail A

Detail B

INERTIAL SENSOR ARCHITECTURE WITH BALANCED SENSE MODE AND IMPROVED IMMUNITY TO QUADRATURE EFFECTS

TECHNICAL FIELD

The present invention relates to inertial sensors, particularly to angular displacement sensors that can be used to detect angular position, speed or acceleration, and more particularly to single axis pitch/roll miniaturized high performance gyroscopes.

PRIOR ART

Rotational movement detection is important in the automotive and aviation sectors as well as satellite navigation systems. Gyroscopes based on microelectromechanical systems can be miniaturized so as to be integrated in smartphones and smart devices.

Gyroscopes are typically referred as pitch, roll and/or yaw gyroscopes according to along which axis they are measuring the angular velocity. Pitch and roll gyroscopes measure the angular velocity around in-plane directions, while yaw gyroscopes measure the angular velocity around a direction perpendicular to the device plane. A so-called 3-axis gyroscope simultaneously measures the angular velocity around three perpendicular directions.

It is well known that pitch/roll microelectromechanical systems (MEMS) gyroscopes are one of the main limitations towards a high-performance 3-axis MEMS inertial measurements units (MEMS IMU) due to inherent constraints given by the classical MEMS processes for what concern out-of-plane devices, e.g. constant out-of-plane thickness, fixed gap between suspended structure and the substrate.

Capacitive solutions proposed in the literature cannot reach the target performances of several high-end applications. A possible solution to obtain a high-performance 3-axis MEMS IMU can be to exploit yaw devices only. In this case, three yaw devices are carefully aligned during the assembly process to create a system sensitive to angular velocities in all the three space directions. However, this approach requires a higher cost in the mounting process and a larger package with respect to 3-axis monolithic devices. Besides, alignment is limited by the assembly process and is subject to errors.

Micro and nanoelectromechanical systems (M&NEMS) technology based on piezoresistive NEMS sensing can potentially achieve high-end performance. However, as a matter of fact, previous literature disclosures of pitch/roll gyroscopes showed many drawbacks in such devices:

a lower sensitivity with respect to the yaw counterpart, due to limited displacement in the out-of-plane direction and the strong relationship between the sense lever factor and the MEMS layer thickness, which is fixed by the process, high quadrature levels, further enhanced if the distribution of masses and anchor points in the structure is not balanced, a poor effectiveness of quadrature compensation if torsional sensing modes are exploited, due to the changing gap of quadrature electrodes from the inner to the outer part of the sensor, a poor predictability of performance, arising from the impossibility to use rigid body assumptions in tilting structures without significant errors.

The best solution for a 3-axis system would be to solve at least some of the issues above for pitch (or roll) devices, so that they can be fabricated on the same substrate as yaw devices, giving intrinsically perfect alignment between them and allowing smaller packages. Some pitch/roll inertial sensors based on piezoresistive sensing are disclosed in the following publications:

S. Dellea, P. Rey and G. Langfelder, "MEMS Gyroscopes Based on Piezoresistive NEMS Detection of Drive and Sense Motion," presents pitch gyroscopes with piezoresistive NEMS detection for both drive and sense mode, M. Gadola et al., "600 μdps/√Hz, 1.2 mm2 MEMS Pitch Gyroscope," presents improvements in M&NEMS pitch gyroscopes through an architecture implementing quadrature compensation, However, none of them discloses an inertial sensor that satisfactorily solve the above-stated problems.

Therefore, a general objective of the present invention is to provide a pitch/roll inertial sensor which features a better sensitivity and that is more immune to quadrature effects than already existing devices based on piezoresistive sensing.

SUMMARY

To at least one of these ends, it is provided an inertial sensor comprising:

a substrate which defines a device plane extending along a drive excitation direction and a rotation direction normal to the drive excitation direction, the device plane being perpendicular to a detection direction, a sense lever pivotably mounted to the substrate around a rotation axis directed along the rotation direction through sense-to-substrate elastic means comprising at least one sense-to-substrate spring, the sense lever being tilted, relatively to the drive excitation direction, of a tilt called lever tilt, a first drive frame, a second drive frame, a first sense frame connected to the first drive frame through first sense-to-drive elastic means comprising at least one first sense-to-drive spring and connected to the sense lever through first sense-to-lever elastic means comprising at least one first sense-to-lever spring, the first sense frame being tilted, relatively to the drive excitation direction, of a tilt called first tilt, a second sense frame connected to the second drive frame through second sense-to-drive elastic means comprising at least one second sense-to-drive spring and connected to the sense lever through second sense-to-lever elastic means comprising at least one second sense-to-lever spring, the second sense frame being tilted, relatively to the drive excitation direction, of a tilt called second tilt, a sensing system connected to the sense lever and comprising at least one strain gauge mechanically stressed by the sense lever when said sense lever is rotating around the rotation axis, an excitation device configured to force the first drive frame and the second drive frame into opposite motions going along the drive excitation direction.

In this inertial device, the first sense-to-drive elastic means, the first sense-to-lever elastic means, the second sense-to-drive elastic means and the second sense-to-lever elastic means are all configured so that upon the inertial sensor being subjected to a rotational movement about the rotation axis, in a transversal plane extending along the drive excitation direction and the detection direction, the ratio of the first tilt to the lever tilt and the ratio of the second tilt to the lever tilt are both lower than 0.1, preferably lower than 0.01.

Some of the advantages of the ratio of the first tilt to the lever tilt and the ratio of the second tilt to the lever tilt being lower than 0.1 are:

a better coupling between the Coriolis mass and the sense lever, and as a result a lower Coriolis mass displacement needed to obtain high stress level on the sense NEMS gauges. This is fundamental for pitch or roll devices in which out-of-plane displacements are usually very limited.

a lower native quadrature thanks to the more balanced mechanical design.

a more efficient quadrature compensation. Indeed, quadrature compensation electrodes, which are usually disposed underneath the structure comprising the sense lever and the sense frames, benefit from this type of motion.

BRIEF DESCRIPTION OF THE FIGURES

The foregoing and other aspects of the embodiments of this invention are made more evident in the following Detailed Description, when read in conjunction with the attached Drawing Figures, wherein.

Figure 1:
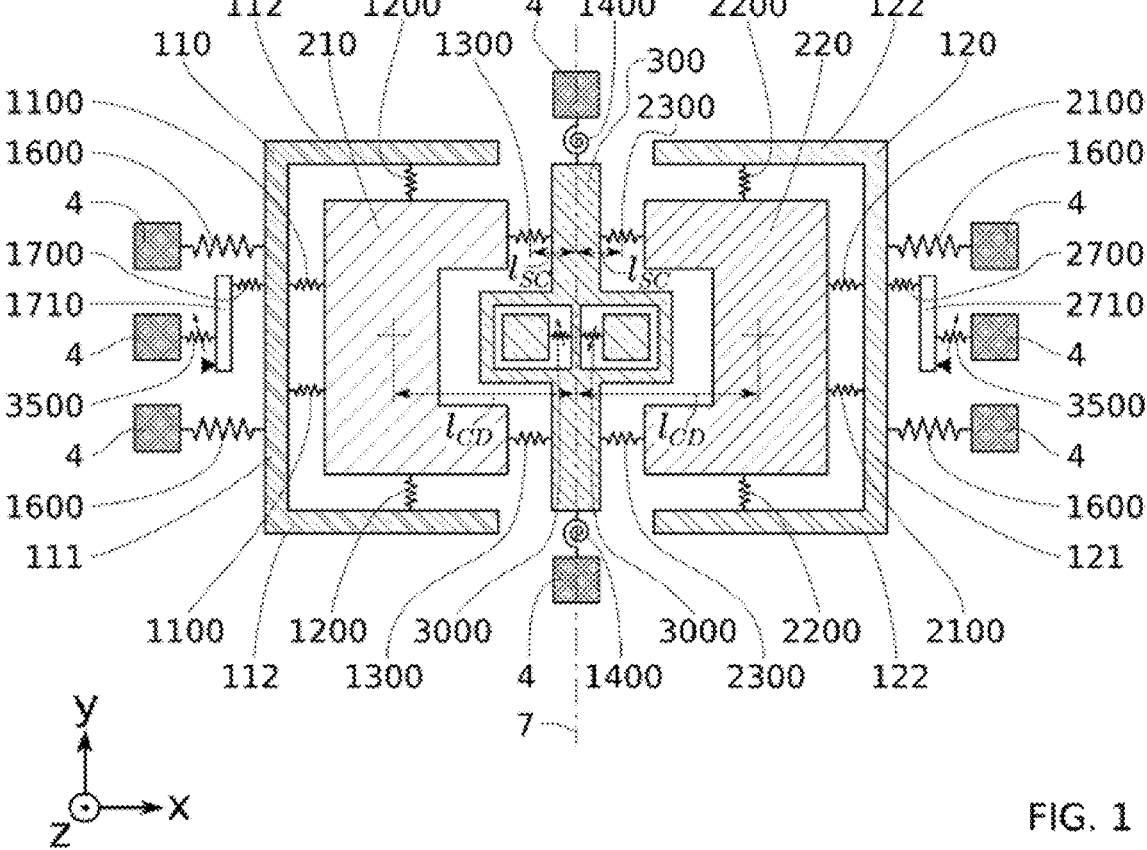
FIG. 1 is a simplified top view of the inertial device according to the invention highlighting the elastic connections between different components of said inertial device.

The figures are given as example and are not restrictive to the invention. They are guideline schematic representations designed to facilitate the understanding of the invention and they are not necessarily at the scale of practical implementations.

The present invention also relates to a detection system comprising a plurality of inertial sensors according to the present invention. According to an advantageous embodiment, the detection system features at least two inertial sensors having perpendicular rotation directions.

DETAILED DESCRIPTION

Before performing a detailed review of the different embodiments of the present invention, here are stated the optional characteristics that can eventually be implemented, in association or alternatively.

According to a particularly advantageous embodiment:

both the first sense-to-drive elastic means and the second sense-to-drive elastic means have a translational stiffness along the detection direction, called sense-to-drive out-of-plane translational stiffness $K_{CD}$, and a torsional stiffness about the rotation direction, called sense-to-drive torsional stiffness $C_{CD}$, both the first sense-to-lever elastic means and the second sense-to-lever elastic means have a translational stiffness along the detection direction, called sense-to-lever out-of-plane translational stiffness $K_{SC}$, and a torsional stiffness about the rotation direction, called sense-to-lever torsional stiffness $C_{SC}$, the sense-to-substrate elastic means have a translational stiffness along the drive excitation direction, called sense-to-substrate translational stiffness $K_{TOR}$, and a torsional stiffness about the rotation direction, called sense-to-substrate torsional stiffness $C_{TOR}$, both the centre of rotation of the first sense-to-drive elastic means and the centre of rotation of the second sense-to-drive elastic means are separated from the rotation axis along the drive excitation direction by a distance called sense-drive rotation distance $I_{CD}$, both the centre of rotation of the first sense-to-lever elastic means and the centre of rotation of the second sense-to-lever elastic means are separated from the rotation axis along the drive excitation direction by a distance called sense-lever rotation distance $I_{SC}$, both the centre of mass of the first sense frame and the centre of mass of the second sense frame are separated from the rotation axis along the drive excitation direction by a distance called centre-of-mass distance $x_C$, the at least one strain gauge has a translational stiffness along the drive excitation direction, called gauge translational stiffness $K_G$, the substrate and the at least one strain gauge have respectively a substrate thickness $h_S$ and a gauge thickness $h_G$ in the detection direction, with $$I_{CD} - x_C =$$

$$-\frac{C_{OS}K_{SC}(I_{SC} - x_C)}{K_{CD}(C_{OS} + 2(C_{SC} + K_{SC}I_{SC}^2))} + \frac{2C_{SC}K_{SC}x_c}{K_{CD}(C_{OS} + 2(C_{SC} + K_{SC}I_{SC}^2))} \pm 1 \ \mu m,$$

$$\text{with } C_{OS} = C_{TOR} + \frac{2K_G K_{TOR}Z_G^2}{2K_G + K_{TOR}} \text{ and } Z_G = \frac{h_S - h_G}{2}.$$

According to an example, the first sense-to-drive elastic means also comprise at least one first additional sense-to-drive spring, the at least one first sense-to-drive spring connecting the first sense frame to a first portion of the first drive frame extending mainly along the rotation direction and the at least one first additional sense-to-drive spring connecting the first sense frame to a second portion of the first drive frame extending mainly along the drive excitation direction.

In a similar manner, according to an example, the second sense-to-drive elastic means also comprise at least one second additional sense-to-drive spring, the at least one second sense-to-drive spring connecting the second sense frame to a first portion of the second drive frame extending mainly along the rotation direction and the at least one second additional sense-to-drive spring connecting the second sense frame to a second portion of the second drive frame extending mainly along the drive excitation direction. Increasing the number of springs connecting the sense frames to the drive frames and distributing the additional springs in different portions of the drive and sense frames like perpendicular portions of the drive frames can help better adjust the elastic means between the frames and therefore help achieve a very low tilting of the sense frames when the inertial device is subjected to a rotational movement.

According to an advantageous embodiment, the sense-to-substrate elastic means is accommodated within the sense lever.

According to an example, the first drive frame and the second drive frame are connected through at least one connection spring. This ensures a single coupled anti-phase drive mode.

According to an advantageous embodiment, the inertial sensors further comprises at least one compensation electrode mainly extending into a plane parallel to the device plane. Compensation electrode help reduce instability and noise levels in the inertial device. Combined with a translational motion of the sense frames, compensation electrodes are particularly advantageous as they counterbalance a simple force and not a torque as in previous device that feature a larger tilting of the sense frames.

According to an example, the sensing system is accommodated within the sense lever. This can help mechanically protect the sensing system and improve the robustness of the inertial device.

According to an advantageous embodiment, the sense lever comprises a central beam which extends along the rotation axis and to which the sensing system is connected.

According to an advantageous embodiment, the sensing system comprises at least one connection zone configured to electronically connect the at least one strain gauge.

Unless otherwise indicated in the context of the present application, the terms "thickness" and "depth" refer to dimensions oriented along the thickness of the substrate.

Terms like "on", "underlying", "positioned on", or "above" or the equivalents thereof do not necessarily mean a direct contact, but, a priori, any position where staking is effective. This includes the presence of interlayers between the superimposed parts.

The expression "being tilted" is used as a synonym for "forming an angle".

The following detailed description of the invention refers to the accompanying drawings. While the description includes exemplary embodiments, other embodiments are possible, and changes may be made to the embodiments described without departing from the spirit and scope of the invention.

Some advantageous features will be described below. Then some exemplary embodiments and use cases will be further detailed in regard with the drawings.

Structural Description

Figure 2A:
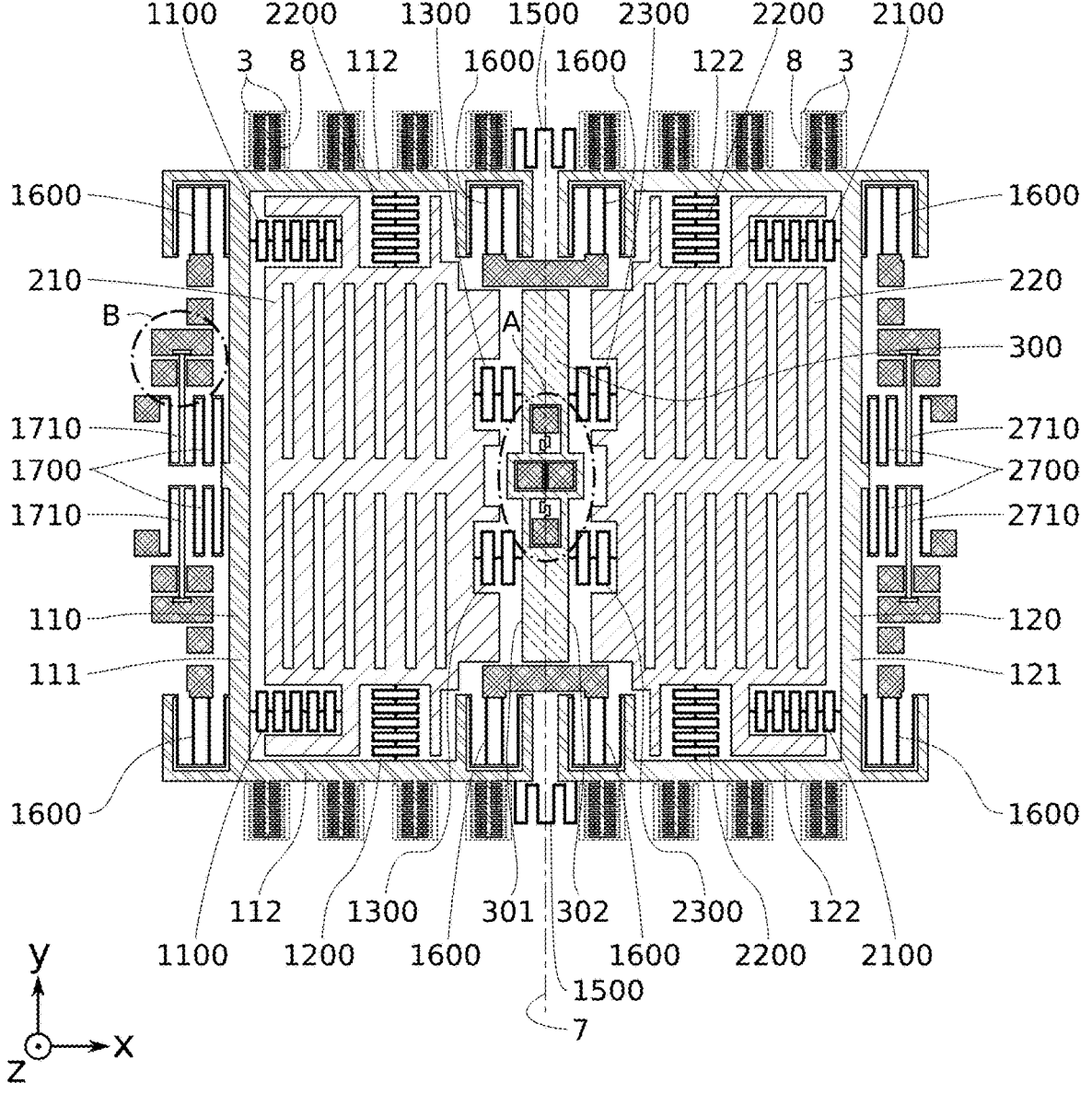
FIG. 2A is a top view of the inertial device as claimed in the present patent application while at rest.

The inertial sensor 1 will now be described referring to FIG. 1 and FIG. 2A.

The inertial sensor 1 comprises a substrate 2 extending along a drive excitation direction x and a rotation direction y. The drive excitation direction x and the rotation direction y are normal to each other. They are both also normal to a third direction called detection direction z. The substrate 2 defines a plane called device plane also extending along the drive excitation direction x and the rotation direction y.

The inertial sensor 1 includes an excitation device 3 required for setting into motion the device thereby creating a Coriolis effect. The excitation device 3 typically includes push-pull comb finger electrodes 8 in an anti-phase motion. Comb finger electrodes actuators are common knowledge in microelectronics. It makes use of tangential electrostatic forces for driving. Such actuators are consisting of pairs of comb-fingers stators facing each other and driving comb-fingers rotors attached to the device to be actuated.

Figure 3:
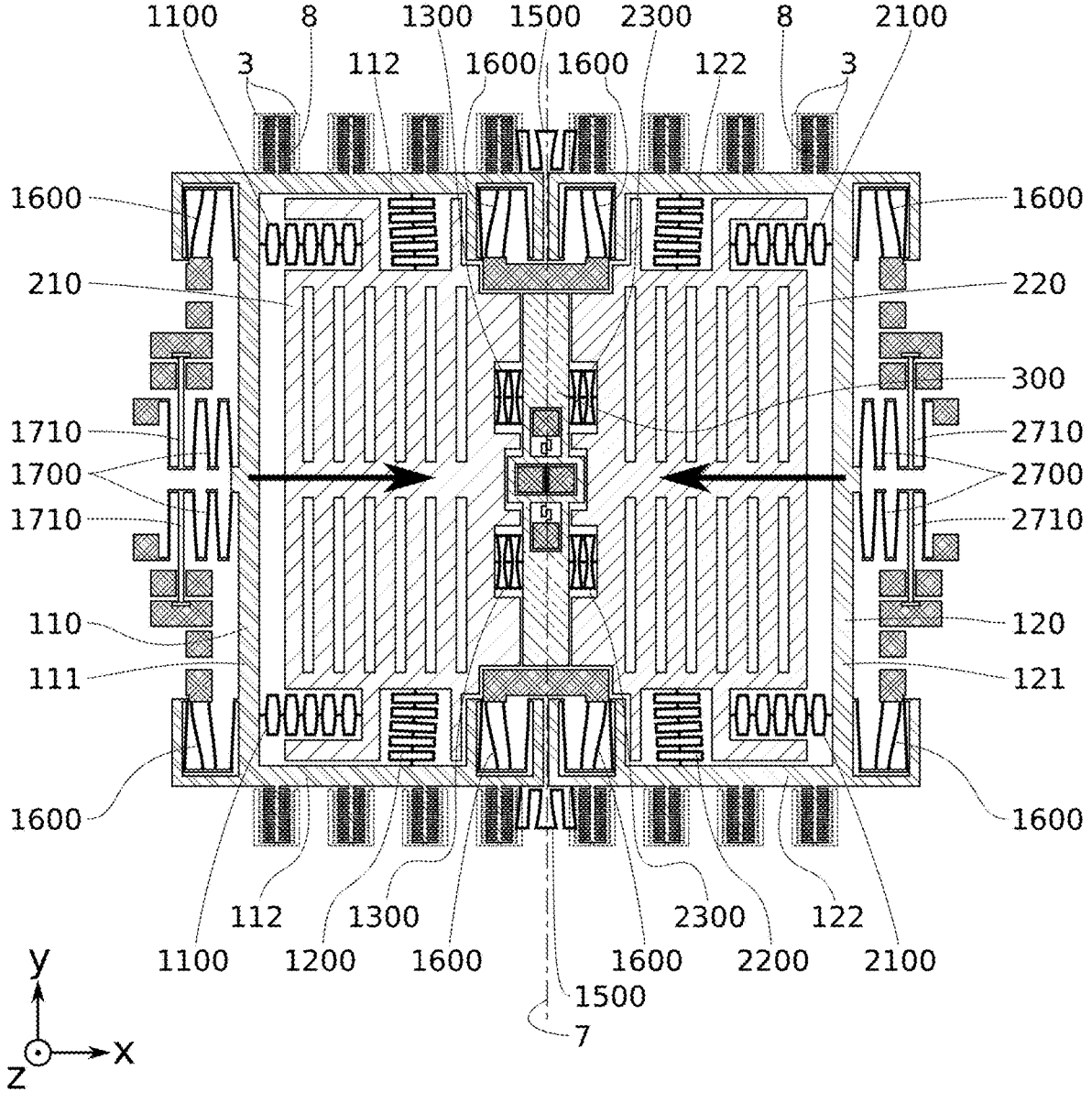
FIG. 3 illustrates the inertial sensor as claimed in the present patent application in its drive mode.

In this case, the excitation device is configured to put into motion along the drive excitation direction x a first drive frame 110 and a second drive frame 120, as depicted in FIG. 3. The first drive frame 110 and the second drive frame 120 have only one degree of freedom, along the drive excitation direction x. They are actuated by the excitation device in an anti-phase motion, meaning the direction of their respective motions are opposite to each other. This consists in the so-called drive motion.

Preferably, the first drive frame 110 and the second drive frame 120 are symmetrical to each other with respect to a rotation axis 7 extending along the rotation direction y. Advantageously, the first drive frame 110 and the second drive frame 120 are connected to each other through connection springs 1500. The presence of such connections springs 1500 ensures a single coupled anti-phase drive mode. The connection springs 1500 are preferably tuning fork springs.

Advantageously, the first drive frame 110 and the second drive frame 120 are both connected to anchor points 4 of the substrate 2 through at least one additional drive spring 1600.

The inertial sensor 1 also features a first sense frame 210 and a second sense frame 220 that have two degrees of freedom, along the drive excitation direction x and the detection direction z. The first sense frame 210 is connected to the first drive frame 110 through first sense-to-drive elastic means that comprise at least one first sense-to-drive springs 1100. The first sense-to-drive elastic means can also comprise at least one first additional sense-to-drive spring 1200. As depicted in FIGS. 1 and 2A, the first sense-to-drive spring 1100 and the first additional sense-to-drive spring 1200 are advantageously connected to portions 111, 112 of the first drive frame 110 that are perpendicular. For example, the first portion 111 mainly extends along the rotation direction y while the second portion 112 of the first drive frame 110 mainly extends along the drive excitation direction x. Such a disposition of the springs 1100, 1200 makes it possible to better control the movement of the first sense frame 210 and minimize its tilting around the rotation axis 7.

The second sense frame 220 is connected to the second drive frame 120 through second sense-to-drive elastic means that comprise second sense-to-drive springs 2100. The second sense-to-drive elastic means can also comprise second additional sense-to-drive springs 2200. The features of the first sense-to-drive springs 1100 and the first additional sense-to-drive springs 1200 can be applied mutatis mutandis to the second sense-to-drive springs 2100 and the second additional sense-to-drive springs 2200, respectively.

The inertial sensor 1 further comprises a sense lever 300 pivotably mounted to the substrate 2 around a rotation axis 7 directed along the rotation direction y. The sense lever 300 is mounted to the substrate 2 through sense-to-substrate elastic means, comprising at least one sense-to-substrate spring 1400. The sense-to substrate springs 1400 are preferably serpentine springs or folded springs. The sense lever 300 preferably features at least one aperture 303 that accommodates the sense-to-substrate springs 1400 and the anchor points 4 they are connected to.

The sense lever 300 is furthermore connected to the first sense frame 210 and to the second sense frame 220 through first sense-to-lever elastic means comprising at least one first sense-to-lever spring 1300 and through second sense-to-lever elastic means comprising at least one second sense-to-lever spring 2300, respectively.

7

Figure 4A:
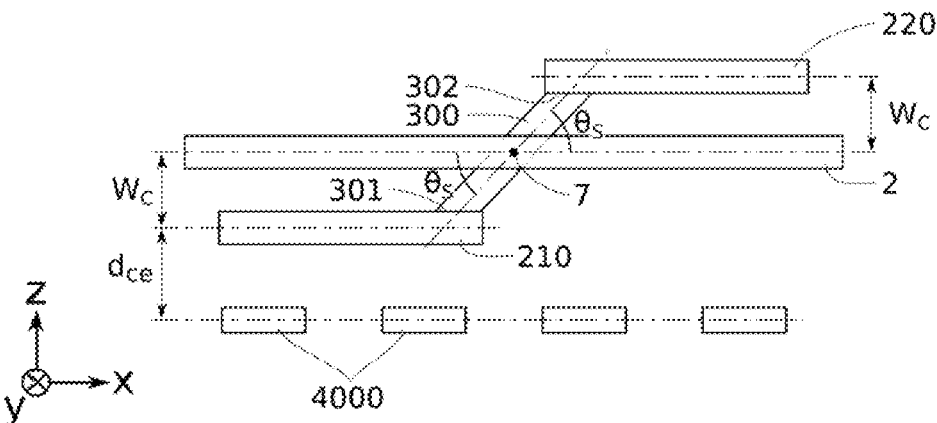
FIG. 4A is a simplified side view of the inertial device as claimed in the present patent application when pure translational motion of the sense frames is reached.

Upon being excited along the drive excitation direction x and under the effect of the Coriolis acceleration, the first and second sense frames 210, 220 are driven along the detection direction z in an anti-phase motion. More specifically, as depicted in FIG. 4, when the first sense frame 210 goes one way along the detection direction z, the second sense frame 220 is moving in the opposite direction: their motions are symmetrical about the rotation axis 7. This motion is transmitted to the sense lever 300 which, upon being driven in opposite directions at each of its lateral sides 301, 302 by the sense-to-lever springs 1300, 2300, rotates around the rotation axis 7. This motion, called sense motion, is therefore representative of the rotation movement the inertial sensor 1 is subjected to. The tilt between the sense lever 300 and the drive excitation direction x is called lever tilt and is denoted by $\theta_S$ in FIG. 4A.

Sense Frames Displacement

A pure translation motion of the sense frames 210, 220 along the detection axis z, without any rotational component, can be reached through an accurate balance of the torques resulting from the sense-to-drive elastic means, the sense-to-lever elastic means and the distribution of the centres of gravity of the different frames. A pure translation motion results in the ratio of the first tilt to the lever tilt and the ratio of the second tilt to the lever tilt being equal to zero, which is the best-case scenario and makes it possible to achieve excellent device performances.

Figure 4B:
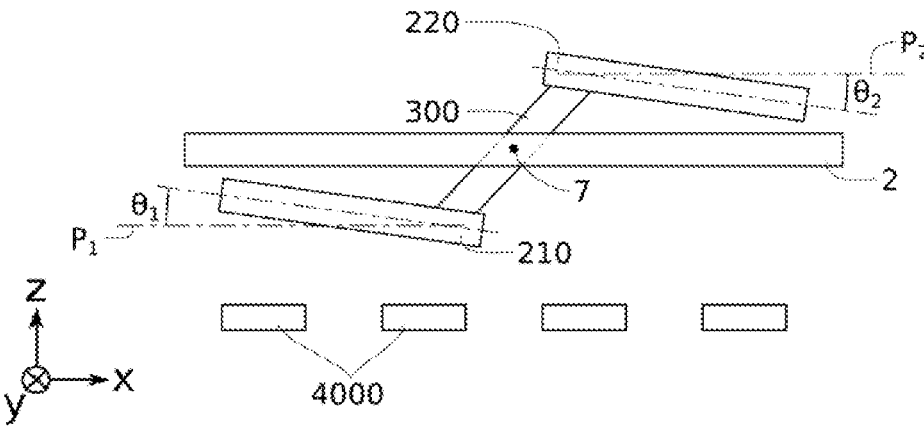
FIG. 4B is a simplified side view of the inertial device as claimed in the present patent application when the sense frames deviate from a pure translational motion but significant improvement over prior art is still achieved.

FIG. 4A illustrates the pure translation of the sense frames 210, 220 along the detection direction z that is achieved in the ideal case. In this case, thanks to the appropriate designing of the elastic means, the combination of the excitation and the rotation motions results in the sense frames 210, 220 constantly extending mainly in a plane parallel to the device plane. FIG. 4B illustrates how the sense frames 210, 220 can tilt a bit and deviate from a perfect parallel motion. As depicted, the first sense frame 210 features a first tilt $\theta_1$ in the transversal plane xz defined by the rotation direction y and the detection direction z. The first tilt $\theta_1$ is measured between the device plane and a first tilting plane $P_1$ the first sense frame 210 is mainly extending along during the motion. Similarly, the second sense frame 220 features a second tilt $\theta_2$ in the transversal plane xz measured between the device plane and a second tilting plane $P_2$ the second sense frame 220 is mainly extending along during the motion. For the sake of clarity, in FIGS. 4A and 4B, the sense-to-drive elastic means are not represented.

Within the structure described above, the tilting of the sense frames 210, 220 can be adjusted, in combination with or independently of adjusting the ratio of the first tilt to the lever tilt and the ratio of the second tilt to the lever tilt. The tilting of the sense frames 210, 220 relatively to the device plane is as low as possible. Advantageously, the first tilt $\theta_1$ and second tilt $\theta_2$ are both lower than 5°, preferably lower than 3°. Preferably, the sense frames are constantly in a plane parallel to the device plane, i.e. the first tilt $\theta_1$ and second tilt $\theta_2$ are equal to 0, like in FIG. 4A.

Some of the advantages of the sense frames moving in a translational motion or having a very low inclination relatively to the device plane are:

a better coupling between the Coriolis mass and the sense lever, and as a result a lower Coriolis mass displacement needed to obtain high stress level on the sense NEMS gauges. This is fundamental for pitch or roll devices in which out-of-plane displacements are usually very limited.

a lower native quadrature thanks to the more balanced mechanical design.

a more efficient quadrature compensation. Indeed, quadrature compensation electrodes, which are usually disposed underneath the structure comprising the sense lever and the sense frames, benefit from this type of motion.

All these advantages derive from the fact that making the sense frames move in a translational or almost translational manner nulls or at least reduces the parasitic rotation of the sense lever.

Figure 5:
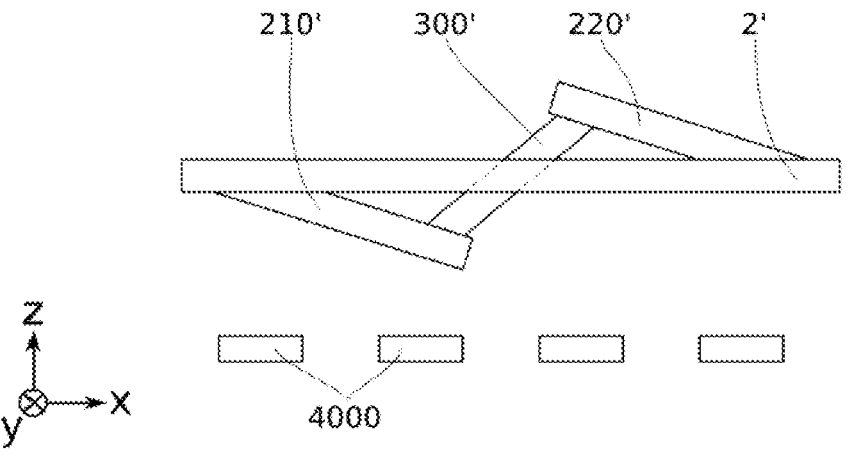
FIG. 5 is a side view of the motion of the sense frames as in already existing technologies.

FIG. 5 illustrates the motion of the sense frames 210', 220' in state-of-the-art inertial sensors. In such architectures, the sense frames 210', 220' are more securely connected to the substrate 2' and feature a bigger tilt with respect to the device plane.

How such low ratios $\theta_1/\theta_S$ and $\theta_2/\theta_S$ can be achieved and/or how such a pure translational or approaching motion can be achieved will now be described.

Each of the elastic means involved in the inertial sensor 1 can be characterized by a translational stiffness and/or a torsional stiffness. The table below synthesizes the different stiffnesses of each of the elastic means and along/about which axis they are measured.

| | Translational stiffness, measuring direction | Torsional stiffness, measuring direction |
|---|---|---|
| First and second sense-to-drive elastic means | sense-to-drive out-of-plane translational stiffness $K_{CD}$, detection direction z | sense-to-drive torsional stiffness $C_{CD}$, rotational direction y |
| First and second sense-to-lever elastic means | sense-to-lever out-of-plane translational stiffness $K_{SC}$, detection direction z | sense-to-lever torsional stiffness $C_{SC}$, rotational direction y |
| Sense-to-substrate elastic means | sense-to-substrate translational stiffness $K_{TOR}$, drive excitation direction x | sense-to-substrate torsional stiffness $C_{TOR}$, rotational direction y |
| Strain gauges | gauge translational stiffness $K_G$, drive excitation direction x | — |

Other parameters are important when designing the inertial device 1:

The center of rotation of the first sense-to-drive elastic means and the rotation axis 7 are separated in the drive excitation direction x by a sense-drive rotation distance $l_{CD}$.

The center of rotation of the second sense-to-drive elastic means and the rotation axis 7 are separated in the drive excitation direction x by a sense-drive rotation distance $l_{CD}$ as well.

The centre of rotation of the first sense-to-lever elastic means and the rotation axis 7 are separated in the drive excitation direction x by a sense-lever rotation distance $l_{SC}$.

The centre of rotation of the second sense-to-lever elastic means and the rotation axis 7 are separated in the drive excitation direction x by a sense-lever rotation distance $l_{SC}$ as well.

The substrate 2 has a substrate thickness $h_S$ in the detection direction z.

The at least one strain gauge has a gauge thickness $h_S$ in the detection direction Z.

It has been found that, so as to achieve a pure translational motion of the sense frames 210, 220 and therefore in order to have $\theta_1/\theta_S=0$ and $\theta_2/\theta_S=0$, the parameters characterizing the inertial device 1 should follow the following formula:

$$l_{CD} - x_C = -\frac{C_{OS}K_{SC}(l_{SC} - x_C)}{K_{CD}(C_{OS} + 2(C_{SC} + K_{SC}l_{SC}^2))} + \frac{2C_{SC}K_{SC}x_C}{K_{CD}(C_{OS} + 2(C_{SC} + K_{SC}l_{SC}^2))},$$

with $$C_{OS} = C_{TOR} + \frac{2K_G K_{TOR} Z_G^2}{2K_G + K_{TOR}} \text{ and } Z_G = \frac{h_S - h_G}{2}$$

$C_{OS}$ is called total sense-to-substrate torsional stiffness. It is the overall torsional stiffness around the rotation direction y resulting between the sense lever 300 and the anchor points 4, thus taking into account the contribution of the strain gauges 3000. $Z_G$ is called gauge center height and is set by process thicknesses $h_S$ and $h_G$.

The fact that the sense frames 210, 220 move in a pure translational motion simplifies the model development thanks to a rigid body assumption. This results in simplifying the prediction of the sensitivity of the device, thus making the rigid body assumption more reliable than in former pitch devices from the literature based on NEMS piezoresistive sensing.

Moreover, such a translational pitch/roll architecture results in a better coupling between the sense frames 210, 220 and the sense lever 300. This results in a lower displacement along the detection direction z of the sense frames for a desired stress target applied on the strain gauges 3000. For example, it was shown that, for the same amount of stress of 200 MPa applied to the strain gauges 3000, the herein described solution requires a lower out-of-plane displacement, in the order of 50 nm, with respect to the maximum z-displacement of the previous design depicted in FIG. 5 which is around 90 nm.

The balanced architecture of the inertial sensor and balanced motion of the sense frames are extremely beneficial as it ensures a lower native quadrature in the device.

As it will be described below, a pure translational motion of the sense frames is also beneficial when it comes to quadrature compensation.

It should be understood that a significant improvement of the coupling between the sense frames and the sense lever, of the minimum lever of native quadrature, and in quadrature compensation efficiency can be achieved even though the previous formula isn't perfectly matched. It is considered that significant improvements over already existing technologies $$l_{CD} - x_C =$$
$$-\frac{C_{OS}K_{SC}(l_{SC} - x_C)}{K_{CD}(C_{OS} + 2(C_{SC} + K_{SC}l_{SC}^2))} + \frac{2C_{SC}K_{SC}x_C}{K_{CD}(C_{OS} + 2(C_{SC} + K_{SC}l_{SC}^2))} \pm 1 \text{ µm}.$$

Axial Stress Applied on the Strain Gauges

The expression of the axial stress that is applied on the strain gauges 300 when a pure translational motion of the sense frames 210, 220 is achieved will now be detailed. When pure translational motion is achieved, the rotation $\theta_S$ of the sense lever 300 is given by the following formula:

$$\theta_S = \frac{2K_{SC}l_{SC}}{C_{OS} + 2(C_{SC} + K_{SC}l_{SC}^2)}w_C$$

where $w_C$ is the translational displacement of the sense frames 210, 220, as depicted in FIG. 4A.

The sense lever factor $\Gamma_S$, indicative of the coupling between the sense frames and the sense lever, is given by:

$$\Gamma_S = \frac{\Delta L}{w_C} = \frac{l_G \theta_S}{w_C} = \frac{l_G}{l_{SC}} * \frac{2K_{SC}l_{SC}^2}{C_{OS} + 2(C_{SC} + K_{SC}l_{SC}^2)}$$

where $\Delta L$ is the elongation of the strain gauge and IG is the distance between the center of the strain gauges 3000 (characterized by the gauge center height $Z_G$) and the rotational axis 7 in the transversal plane xz.

The axial stress $\sigma$ applied to the strain gauges 3000 can therefore be expressed as follows:

$$\sigma = E * \frac{\Delta L}{L_G} = E * \frac{\Gamma_S * w_C}{L_G}$$

where $L_G$ is the length of the strain gauges 3000 along the drive excitation direction x when at rest and E is the Young modulus of the strain gauges 3000.

The above-stated formulas highlight the fact that in the present device design, the stiffnesses and position of the elastic means between the sense lever 300 and the sense frames 210, 220 are the most important design parameters for setting the stress applied to the strain gauges 3000 to a target value. Then, the translational motion of the sense frames 210, 220 is obtained through the correct sizing and positioning of the elastic means that connect them to the drive frames 110, 120.

Sensing System

The inertial sensor 1 further includes a sensing system connected to the sense lever 300.

The sensing system is actuated by the sense lever 300 when it rotates around the rotation axis 7, allowing Coriolis force sensing.

The sensing system comprises at least one strain gauge 3000 that gets subjected to axial stress when the sense lever 300 rotates around the rotation axis 7 as depicted in FIG. 4A. The strain gauge 3000 is also subjected to bending stress but its contribution is negligible compared to axial stress contribution to the sensor 1 performance. Preferably, the sensing system includes a pair of strain gauges 3000 comprising a first strain gauge 3001 and a second strain gauge 3002. The first and second strain gauges 3001, 3002 are preferably symmetrically situated with respect to the rotational axis 7. Advantageously, the strain gauges are piezoresistive gauges. The sensing system can further include additional pairs of strain gauges. Using multiple strain gauges in parallel makes it possible to increase the transduction and improve the minimum achievable noise and stability levels.

Central Region

Figure 2B:
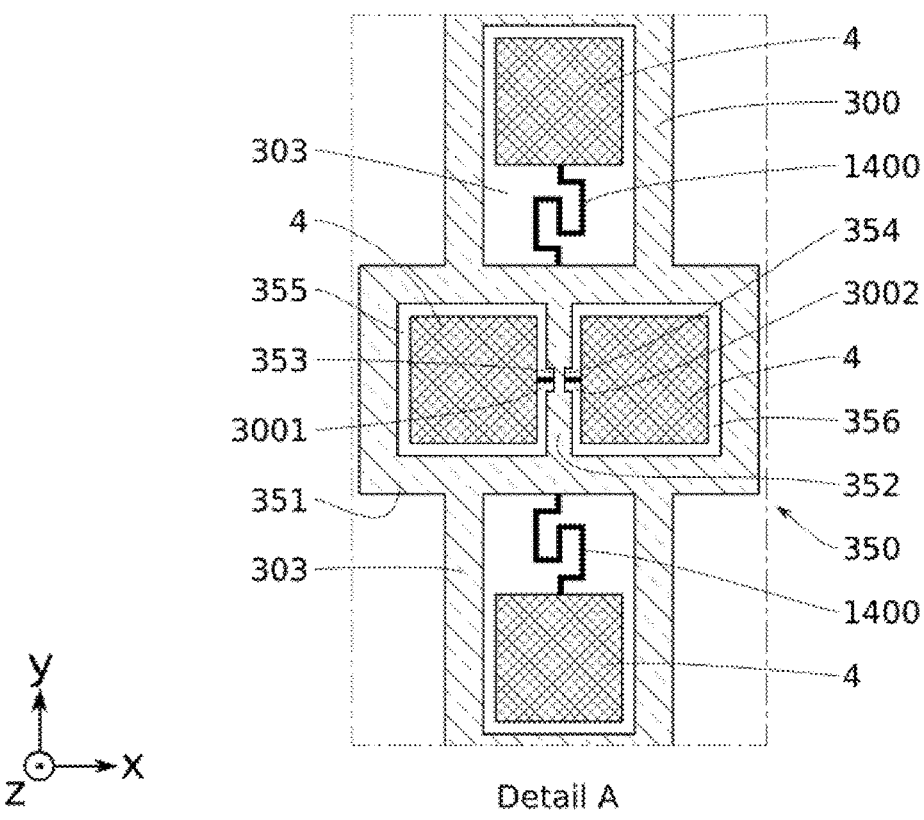
FIG. 2B is a top view of a close-up on part of the sensing system and of the sense lever, in particular its central portion.

As depicted in FIG. 2B, the sense lever 300 can include a central portion 350 which comprises a central frame 351. This central frame 351 defines a closed outer contour of the central portion 350. The central frame 351 typically features four sides—preferably each made of a beam section—opposite in pairs. Adjacent sides of the central frame 351 are typically perpendicular. The central frame 351 is advantageously rectangular or even square-shaped in the device plane, therefore so is the central portion 350. Preferably, the central portion 350 further includes a central beam 352 that mainly extends along the rotational axis 7. This central beam 352 extends mainly between two inner sides of the central frame 351.

The central portion 350—comprising the central frame 351 and the central beam 352—and the rest of the sense lever 300 are configured in one piece. More specifically, they can be formed during the same fabrication steps and be made of the same material like monocrystalline silicon or polysilicon. As a result of these elements being in a single bloc, when the inertial device 1 is subjected to Coriolis acceleration, the central beam 352 tilts around the rotational axis 7 at the same angle as the sense lever 300 as a whole. Monitoring the tilting of the central beam 352 is therefore equivalent to monitoring the tilting of the sense lever 300. This central beam 352 features a first side 353 and a second side 354, opposite each other. Preferably, the first and second strain gauges 3001, 3002 are connected to the first and second sides 353, 354 of the central beam 351. As depicted in FIG. 2B, the central frame 351 and the central beam 352 can define two apertures 355, 356 that can accommodate anchor points 4 to which the first strain gauge 3001 and the second strain gauge 3002 are connected. In this sense, in this embodiment, the central portion 350 and more generally the sense lever 300 accommodates the sensing system. Other configurations of the sense lever 300 can be implemented so that it accommodates the sensing system.

Advantageously, the central portion 350 of the lever 300 is designed to have a stiffness that allow the strain gauges 3000 to be properly stressed, that is to say that the stress on the gauges 3000 are the largest allowed by the technology when the incoming angular rate is the largest to measure.

Drive Sensing

Figure 2C:
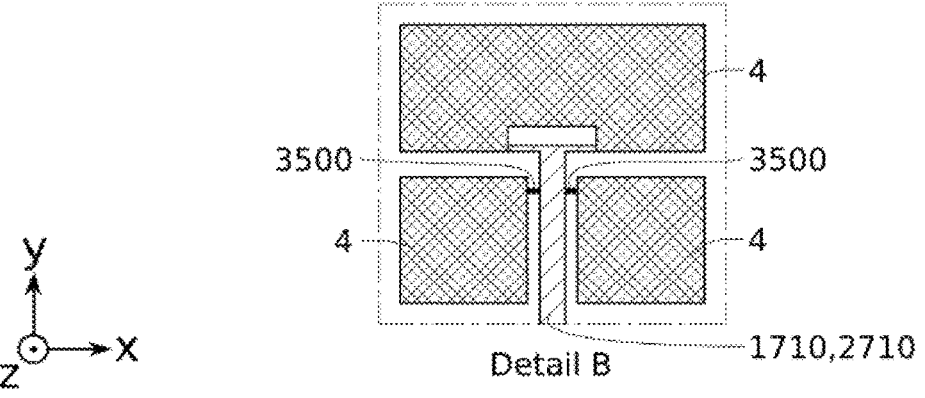
FIG. 2C is a top view of a close-up on a drive sense lever and drive sense gauges that allow drive sensing.
Figure 2C:

In a preferred embodiment, the inertial sensor 1 further includes drive springs 1700, 2700 that respectively connect the first and the second drive frames 110, 120 to drive sense levers 1710, 2710. Advantageously, the drive springs 1700, 2700 are 4-fold springs. Each of the drive sense levers 1710, 2710 is connected at one end to a drive spring 1700, 2700 and at the other end to an anchor point 4 of the substrate 2. The drive springs 1700, 2700 are mainly extending along the drive direction x. They allow but attenuate mechanical drive in the drive excitation direction x between the drive frames 110, 120 and the drive sense levers 1710, 2710. As a result, when the drive frames 110, 120 are moving along the drive excitation direction x, the drive sense levers 1710, 2710 get deformed and deliver stress into drive sense gauges 3500. The drive sense gauges 3500 can be piezoresistive gauges. This system, depicted in FIGS. 2A and 2C, allows drive motion and drive frequency detection. Both can be implemented in an electronic circuit used to operate the inertial sensor 1 so as to improve measurement quality. For example, drive frequency detection is especially useful for compensation of temperature effects to further improve output stability under temperature sweeps. With the addition of the drive springs 1700, 2700, the drive sense levers 1710, 2710 system takes here a minimum role in setting the drive-mode stiffness. It can therefore be independently optimized for signal maximization and corresponding minimization of drive loop phase noise. It should be noted that drive detection can also be achieved through capacitive means.

Compensation Electrodes

In an advantageous embodiment, the inertial sensor 1 comprises compensation electrodes 4000.

Such electrodes typically help reduce the zero-rate-output (ZRO) instability in inertial devices. Indeed, among the various sources of zero-rate-output (ZRO) instability, leakage of quadrature $\Omega_q$ into the sense channel after demodulation errors $\phi_{er}$ is a huge contribution due to possible drifts of both these terms. Referred quadrature $\Omega_q$ originates from electromechanical imperfections, in particular related to non-orthogonality between drive motion and the sense axis—here between the drive excitation direction x and the detection direction y. Suitable compensating electrodes 4000 in closed-loop circuits can compensate quadrature caused by such imperfections.

Here especially, the implemented quadrature compensation is based on strain sensing, typically NEMS (nanoelectromechanical systems) resistive sensing, as opposed to capacitance detection. Capacitance couplings are therefore minimized, yielding an optimal compensation because of the reduced error in phase $\phi_{er}$ resulting from this minimized capacitance couplings.

Furthermore, the herein described design allows a more efficient quadrature compensation. Indeed, the quadrature electrodes 4000 are preferably extending into a plane parallel to the device plane. In the case of the present architecture, the quadrature compensation forces applied by the electrodes 4000 underneath the sense frames 210 are independent on the position of the electrode 4000 itself along the drive excitation direction x, since they counterbalance directly a force and not a torque as in torsional pitch/roll devices like the one depicted in FIG. 5. As an example, the distance $d_{CE}$ between each quadrature compensation electrode 4000 and the sense frames 210, 220 is the same for all the quadrature compensation electrodes 4000 on one side of the device, as depicted in FIG. 4A. Moreover, the sense frames 210, 220 themselves are not subjected to any rotation, thus maximizing the amplitude of quadrature compensation forces.

The presence of quadrature compensation electrodes 4000, together with appropriate electronic control of said compensation, makes it possible to reach better specifications in terms of noise and stability.

Fabrication

The inertial device 1 can be realized starting from a SOI (Silicon On Insulator) wafer. During a first production step, monocrystalline silicon NEMS layer can be patterned to define the strain gauges 3001, 3002, 3500. Following production steps, during which other elements of the inertial sensors 1 (sense lever 300—comprising the central portion 350 and the central beam 352—, drive frames 110, 120, sense frames 210, 220 . . . ) are made—typically including epitaxial growth, ion etching and oxide release—, are common to conventional MEMS processes. The MEMS wafer can then be bonded with eutectic Al—Ge alloy or with other bonding materials like Au—Si, glassfrit . . . to a cap wafer, where cavities and getters yield the final pressure, typically ranging from of a few ten to a few hundred μbar. Advantageously, the strain gauges 3001, 3002, 3500 are of the same material as the sense lever 300. Preferably, at least some of the strain gauges 3001, 3002, 3500 fabrication steps and of sense lever 300 fabrication steps are carried out concurrently.

Plurality of Sensors

Multiple inertial sensors of the same type can be merged to further improve the minimum achievable stability and noise levels. This technique is commonly known as sensor fusion. This has the advantage of improving sensing properties of the inertial device without increasing its thickness if sensors are merged in the device plane. Large packages for specialized applications could fit several tens of inertial sensors 1, potentially exploiting redundancy and cross-correlation techniques for additional performance improvements.

The design herein disclosed is well suited also for high frequency gyroscopes, which could improve the rejection to external vibrations and shocks.

The presented gyroscope could be also properly designed to be a bi-axial device sensitive to out-of-plane and in-plane angular rates. As a matter of fact, finite element method (FEM) simulations show the presence of a mode that is sensitive to out-of-plane rotations that, with a careful mechanical design, could be optimized for the desired behaviour and frequency.

The present inertial sensor can be implemented in a 3-axis MEMS IMU. Thanks to the improvements made with regards to quadrature compensation and sensing coupling, pitch/roll IMU based on the present technology can meet very tight specifications like navigation-grade specifications. High performance 3-axis MEMS IMU could therefore be designed by relying on herein described innovation.

It was shown that, thanks to a balanced design, the inertial sensor 1 can feature very low quadrature effects and an optimized coupling between sense frames and sense lever.

REFERENCES x: drive excitation direction
y: rotation direction
z: detection direction
$P_1$: first tilting plane
$P_2$: second tilting plane
1: inertial sensor
2: substrate
2': substrate according to prior art
3: excitation device
4: anchor point
7: rotation axis
8: comb finger electrode
110: first drive frame
120: second drive frame
210: first sense frame
210': first sense frame according to prior art
220: second sense frame
220': second sense frame according to prior art
300: sense lever
300': sense lever according to prior art
301: first lateral side of the sense lever
302: second lateral side of the sense lever
303: aperture in the sense lever
350: central portion of the sense lever
351: central frame of the central portion
352: central beam of the central portion
353: first side of the central beam
354: second side of the central beam
355: first aperture in the central portion
356: second aperture in the central portion
1100: first sense-to-drive spring
1200: first additional sense-to-drive spring
1300: first sense-to-lever spring
1400: sense-to substrate spring
1500: connection spring
1600: additional drive spring
1700: first drive spring
1710: first drive sense lever
2100: second sense-to-drive spring
2200: second additional sense-to-drive spring

2300: second sense-to-lever spring
2700: second drive spring
2710: second drive sense lever
3000: strain gauge
3001: first strain gauge
3002: second strain gauge
3500: drive sense gauge
4000: compensation electrode

The invention claimed is:

1. An inertial sensor comprising:
a substrate which defines a device plane extending along a drive excitation direction (x) and a rotation direction (y) normal to the drive excitation direction (x), the device plane being perpendicular to a detection direction (z),
a sense lever pivotably mounted to the substrate around a rotation axis directed along the rotation direction (y) through a sense-to-substrate elastic device comprising at least one sense-to-substrate spring, the sense lever configured to be tilted at a lever tilt relatively to the drive excitation direction (x),
a first drive frame,
a second drive frame,
a first sense frame connected to the first drive frame through a first sense-to-drive elastic device comprising at least one first sense-to-drive spring and connected to the sense lever through a first sense-to-lever elastic device comprising at least one first sense-to-lever spring, the first sense frame configured to be tilted at a first tilt relatively to the drive excitation direction (x),
a second sense frame connected to the second drive frame through a second sense-to-drive elastic device comprising at least one second sense-to-drive spring and connected to the sense lever through a second sense-to-lever elastic device comprising at least one second sense-to-lever spring, the second sense frame configured to be tilted at a second tilt relatively to the drive excitation direction (x),
a sensing system connected to the sense lever and comprising at least one strain gauge configured to be mechanically stressed by the sense lever when said sense lever is rotating around the rotation axis,
an excitation device configured to force the first drive frame and the second drive frame into opposite motions along the drive excitation direction (x),
wherein the first sense-to-drive elastic device, the first sense-to-lever elastic device, the second sense-to-drive elastic device and the second sense-to-lever elastic device are configured so that upon the inertial sensor being subjected to a rotational movement about the rotation axis, in a transversal plane (xz) extending along the drive excitation direction (x) and the detection direction (z), the ratio of the first tilt to the lever tilt and the ratio of the second tilt to the lever tilt are both lower than 0.1, and
wherein:
both the first sense-to-drive elastic device and the second sense-to-drive elastic device have a sense-to-drive out-of-plane translational stiffness $K_{CD}$ along the detection direction (z), and a sense-to-drive torsional stiffness $C_{CD}$ about the rotation direction (y),
both the first sense-to-lever elastic device and the second sense-to-lever elastic device have a sense-to-lever out-of-plane translational stiffness $K_{SC}$ along the detection direction (z), and a sense-to-lever torsional stiffness $C_{SC}$ about the rotation direction (y), the sense-to-substrate elastic device has a sense-to-substrate translational stiffness $K_{TOR}$ along the drive excitation direction (x), and a sense-to-substrate torsional stiffness $C_{TOR}$ about the rotation direction (y), both the centre of rotation of the first sense-to-drive elastic device and the centre of rotation of the second sense-to-drive elastic device are separated from the rotation axis along the drive excitation direction (x) by a distance called sense-drive rotation distance $l_{CD}$, both the centre of rotation of the first sense-to-lever elastic device and the centre of rotation of the second sense-to-lever elastic device are separated from the rotation axis along the drive excitation direction (x) by a distance called sense-lever rotation distance $I_{SC}$, both the centre of mass of the first sense frame and the centre of mass of the second sense frame are separated from the rotation axis along the drive excitation direction (x) by a distance called centre-of-mass distance $x_C$, the at least one strain gauge has a translational stiffness along the drive excitation direction (x), called gauge translational stiffness $K_G$, the substrate and the at least one strain gauge have respectively a substrate thickness $h_S$ and a gauge thickness $h_G$ in the detection direction (z), with $$l_{CD} - x_C =$$

$$-\frac{C_{OS}K_{SC}(l_{SC} - x_C)}{K_{CD}(C_{OS} + 2(C_{SC} + K_{SC}l_{SC}^2))} + \frac{2C_{SC}K_{SC}x_C}{K_{CD}(C_{OS} + 2(C_{SC} + K_{SC}l_{SC}^2))} \pm 1\,\mu\text{m},$$

with $$C_{OS} = C_{TOR} + \frac{2K_G K_{TOR} Z_G^2}{2K_G + K_{TOR}} \text{ and } Z_G = \frac{h_S - h_G}{2}.$$

2. The inertial sensor according to claim 1, wherein the first sense-to-drive elastic device further comprises at least one first additional sense-to-drive spring, the at least one first sense-to-drive spring connecting the first sense frame to a first portion of the first drive frame extending along the rotation direction (y) and the at least one first additional sense-to-drive spring connecting the first sense frame to a second portion of the first drive frame extending along the drive excitation direction (x).

3. The inertial sensor according to claim 1, wherein the second sense-to-drive elastic drive further comprises at least one second additional sense-to-drive spring, the at least one second sense-to-drive spring connecting the second sense frame to a first portion of the second drive frame extending along the rotation direction (y) and the at least one second additional sense-to-drive spring connecting the second sense frame to a second portion of the second drive frame extending along the drive excitation direction (x).

4. The inertial sensor according to claim 1, wherein the sense-to-substrate elastic device is accommodated within the sense lever.

5. The inertial sensor according to claim 1, wherein the first drive frame and the second drive frame are connected through at least one connection spring.

6. The inertial sensor according to claim 1, further comprising at least one compensation electrode extending into a plane parallel to the device plane.

7. The inertial sensor according to claim 1, wherein the sensing system is accommodated within the sense lever.

8. The inertial sensor according to claim 1, wherein the sense lever comprises a central beam which extends along the rotation axis and to which the sensing system is connected.

9. The inertial sensor according to claim 1, wherein the sensing system comprises at least one connection zone configured to electronically connect the at least one strain gauge.

10. A detection system comprising a plurality of inertial sensors according to claim 1.

11. The detection system according to claim 10, wherein at least two inertial sensors have perpendicular rotation directions.

* * * * *